US012424612B2

(12) United States Patent
Moeremans et al.

(10) Patent No.: US 12,424,612 B2
(45) Date of Patent: Sep. 23, 2025

(54) POWDER FOR USE IN THE NEGATIVE ELECTRODE OF A BATTERY AND A BATTERY COMPRISING SUCH A POWDER

(71) Applicant: UMICORE, Brussels (BE)

(72) Inventors: Boaz Moeremans, Olen (BE); Kun Feng, Olen (BE); Michal Tulodziecki, Olen (BE); Jean-Sébastien Bridel, Olen (BE); Nicolas Marx, Olen (BE); Stijn Put, Olen (BE)

(73) Assignee: UMICORE, Brussels (BE)

( * ) Notice: Subject to any disclaimer, the term of this patent is extended or adjusted under 35 U.S.C. 154(b) by 0 days.

(21) Appl. No.: 17/767,107

(22) PCT Filed: Oct. 5, 2020

(86) PCT No.: PCT/EP2020/077860
§ 371 (c)(1),
(2) Date: Apr. 7, 2022

(87) PCT Pub. No.: WO2021/069381
PCT Pub. Date: Apr. 15, 2021

(65) Prior Publication Data
US 2022/0352493 A1 Nov. 3, 2022

Related U.S. Application Data

(60) Provisional application No. 62/912,730, filed on Oct. 9, 2019.

(30) Foreign Application Priority Data

Oct. 11, 2019 (EP) ..................................... 19202728
Oct. 11, 2019 (EP) ..................................... 19202741

(51) Int. Cl.
*H01M 4/134* (2010.01)
*H01M 4/02* (2006.01)
(Continued)

(52) U.S. Cl.
CPC ......... *H01M 4/131* (2013.01); *H01M 4/0471* (2013.01); *H01M 4/134* (2013.01);
(Continued)

(58) Field of Classification Search
None
See application file for complete search history.

(56) References Cited

U.S. PATENT DOCUMENTS 10,424,786 B1    9/2019  Mason et al.
11,165,054 B2 *  11/2021 Mason .................. H01M 4/134
(Continued)

FOREIGN PATENT DOCUMENTS

CN    103840140 A    6/2014
CN    107658455 A    2/2018
(Continued)

OTHER PUBLICATIONS

ISA/EP; International Search Report and Written Opinion for International Patent Application No. PCT/EP2020/077860 dated Nov. 27, 2020, 9 pages.
(Continued)

*Primary Examiner* — Tracy M Dove
(74) *Attorney, Agent, or Firm* — NK Patent Law

(57) ABSTRACT

A powder for use in a negative electrode of a battery, said powder comprising particles, wherein the particles comprise a carbonaceous matrix material and silicon-based domains dispersed in the carbonaceous matrix material, wherein the particles further comprise pores wherein at least 1000 cross-sections of pores comprised in a cross-section of the powder satisfy optimized conditions of size and size distribution, allowing the battery containing such a powder to achieve a superior cycle life and a production method of such a powder.

12 Claims, 2 Drawing Sheets

(51) Int. Cl.
    *H01M 4/04*       (2006.01)
    *H01M 4/131*     (2010.01)
    *H01M 4/1391*   (2010.01)
    *H01M 4/1395*   (2010.01)
    *H01M 4/38*       (2006.01)
    *H01M 4/62*       (2006.01)

(52) U.S. Cl.
    CPC ....... *H01M 4/1391* (2013.01); *H01M 4/1395* (2013.01); *H01M 2004/021* (2013.01)

(56) References Cited

U.S. PATENT DOCUMENTS

2008/0145757 A1   6/2008   Mah et al.
2014/0087255 A1   3/2014   Kim et al.
2017/0373308 A1   12/2017   Katou et al.

FOREIGN PATENT DOCUMENTS

EP       3525267 A1   8/2019
WO     2016169150 A1   10/2016
WO     2018165610 A1   9/2018

OTHER PUBLICATIONS

WIPO; International Preliminary Report on Patentability for International Patent Application No. PCT/EP2020/077860 dated Aug. 13, 2021, 12 pages.
"A Basic Guide to Particle Characterization", Inform White Paper, Malvern Instruments Worldwide, 2012, 26 pages.

* cited by examiner

POWDER FOR USE IN THE NEGATIVE ELECTRODE OF A BATTERY AND A BATTERY COMPRISING SUCH A POWDER

CROSS-REFERENCE TO RELATED APPLICATIONS

This application is a U.S. National Stage application of International Patent Application No. PCT/EP2020/077860, filed on Oct. 5, 2020, which claims the benefit of European Patent Application No. 19202728.2, filed on Oct. 11, 2019; European Patent Application No. 19202741.5, filed on Oct. 11, 2019; and U.S. Provisional Patent Application No. 62/912,730, filed on Oct. 9, 2019.

TECHNICAL FIELD AND BACKGROUND

The present invention relates to a powder suitable for use in the negative electrode of a battery and a battery comprising such a powder.

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high energy density combined with a good power performance.

A Li-ion battery typically contains a number of so-called Li-ion cells, which in turn contain a positive electrode, also called cathode, a negative electrode, also called anode, and a separator which are immersed in an electrolyte. The most frequently used Li-ion cells for portable applications are developed using electrochemically active powders such as lithium cobalt oxide or lithium nickel manganese cobalt oxide for the cathode and a natural or artificial graphite for the anode.

It is known that one of the important limitative factors influencing a battery's performance and in particular battery's energy density is the active powder in the anode. Therefore, to improve the energy density, the use of electrochemically active powders comprising silicon in the negative electrode have been investigated over the past years.

A drawback of using a silicon-based electrochemically active powder in an anode is its large volume expansion during charging, which is as high as 300% when the lithium ions are fully incorporated, e.g. by alloying or insertion, in the anode's active powder—a process often called lithiation. The large volume expansion of the silicon-based materials during lithium incorporation may induce stress in the silicon-based particles, which in turn could lead to a mechanical degradation of the silicon-based material. Repeated periodically during charging and discharging of the Li-ion battery, the repetitive mechanical degradation of the silicon-based electrochemically active powder may reduce the life of a battery to an unacceptable level.

Further, a negative effect associated with silicon is that a thick SEI, a Solid-Electrolyte Interface, may be formed on the anode. An SEI is a complex reaction product of the electrolyte and lithium, and therefore leads to a loss of lithium availability for electrochemical reactions and therefore to a poor cycle performance, which is the capacity loss per charging-discharging cycle. A thick SEI may further increase the electrical resistance of a battery and thereby limit the achievable charging and discharging rates.

In principle, the SEI formation is a self-terminating process that stops as soon as a 'passivation layer' has formed on the surface of the silicon-based material. However, because of the volume expansion of silicon-based particles, both silicon-based particles and the SEI may be damaged during discharging (lithiation) and recharging (de-lithiation), thereby freeing new silicon surface and leading to a new onset of SEI formation.

To solve the above-mentioned drawbacks, active powders wherein the silicon-based domains are mixed with at least one component suitable to protect the silicon-based domains from electrolyte decomposition and to accommodate volume changes, are usually used. Such a component may be a carbon-based material, preferably forming a matrix.

Such active powders are mentioned, for example in WO 2018/165610, wherein composite materials with silicon deposited into the pore volume of a porous scaffold material are manufactured. In U.S. Ser. No. 10/424,786, a composite material comprising a porous carbon framework and silicon located within the micropores and/or mesopores of the porous carbon framework, is disclosed. In CN 103840140, a porous carbon silicon composite material comprising porous carbon and silicon particles attached to the pore walls of the porous carbon, is disclosed.

Despite the use of such active powders, there is still room for improvement of the performance of batteries containing Si-based active powders.

In the art, the performance of a battery containing Si-based active powders is generally quantified by a so-called cycle life of a full-cell, which is defined as the number of times or cycles that a cell comprising such material can be charged and discharged until it reaches 80% of its initial discharge capacity. Most works on silicon-based active powders are therefore focused on improving said cycle life.

It is an object of the present invention to provide a stable active powder, which once used in the negative electrode in the battery, is advantageous in that it allows achieving a reduced anode volume expansion and an improved cycle life of the battery.

SUMMARY OF THE INVENTION

This objective is achieved by providing a powder according to claim 1, which once used in the negative electrode of a battery, allows to achieve a reduced anode volume expansion and an improved cycle life of the battery, without loss of specific capacity.

The present invention concerns the following embodiments:

Embodiment 1

In a first aspect, the invention concerns a powder for use in a negative electrode of a battery, said powder comprising particles, said particles comprising a carbonaceous matrix material and silicon-based domains dispersed in said carbonaceous matrix material, said particles further comprising pores, said particles being characterized in that in a cross-section of said powder, said cross-section comprising at least 1000 discrete cross-sections of pores:

- each of said at least 1000 discrete cross-sections of pores has a maximum Feret diameter $xF_{max}$, a minimum Feret diameter $xF_{min}$ and an area, wherein $xF_{max}$, $xF_{min}$ and the area are measured by image analysis of at least one electron microscopy image of said cross-section of said powder, and
- said at least 1000 discrete cross-sections of pores have a number-based distribution of maximum Feret diameters with a d50 value and a d95 value, wherein d95≤150 nm and the ratio d95/d50≤3.0.

When a cross-section of a powder according to the present invention is performed, the powder is crossed by a plane, the same plane thus crosses a number of particles comprised in the powder, a number of silicon-based domains comprised in the particles and a number of pores comprised in the particles. A cross-section according to the present invention therefore represents the intersection of a 3-dimensional body, said 3-dimensional body being for example the powder, the particles, the silicon-based domains, the pores, with this plane. The resulting object is therefore a 2-dimensional object, as for example a circle, an ellipsoid, or any 2-dimensional object with a substantially regular or an irregular shape.

In other words, the cross-section of the powder according to the present invention comprises cross-sections of particles, cross-sections of silicon-based domains and cross-sections of pores.

In the framework of the present invention, the intersection of a 3-dimensional body with a plane is defined by an area, which is delimited by a perimeter being a continuous line forming the boundary of a cross-section in said plane.

Therefore, a discrete cross-section is defined by an individual area and perimeter that are distinct or separate from other areas and perimeters of other discrete cross-sections included in the same plane.

By at least 1000 discrete cross-sections of pores, it is meant at least 1000 single, non-overlapping, cross-sections of pores included in the plane crossing the powder. Said at least 1000 discrete cross-sections of said pores may be considered as representative of the total number of discrete cross-sections of pores included in the plane crossing the powder.

Even though the maximum and minimum Feret diameters are concepts which are well known to a person skilled in the art, in the framework of the present invention they are meant as follows. By the Feret diameter it is meant the distance between two parallel lines, tangent to the perimeter of a cross-section of a pore at an arbitrary angle. The maximum Feret diameter xFmax is the Feret diameter at the angle of the tangents at which the Feret diameter is the largest and corresponds to the maximum straight-line distance between two points on the perimeter of a cross-section of a pore. Analogously, the minimum Feret diameter xFmin is the Feret diameter at the angle of the tangents at which the Feret diameter is the smallest. This definition of the Feret diameter is illustrated in FIG. 1.

By a powder suitable for use in the negative electrode of a battery, it is meant an electrochemically active powder, comprising electrochemically active particles, which are able to store and release lithium ions, respectively during the lithiation and the delithiation of the negative electrode of a battery. Such a powder may equivalently be referred to as "active powder".

For clarity it is remarked that the silicon-based domains are dispersed in the carbonaceous matrix material as separate small volumes of silicon, silicon-based alloy or partially oxidized silicon or silicon-based alloy, which are spread throughout the matrix material. These small volumes may be discrete particles or may be formed in situ in the matrix material as deposits from a silicon-containing liquid or gaseous precursor.

The silicon-based domains may have any shape, e.g. substantially spherical but also irregularly shaped, rod-shaped, plate-shaped, etc.

The average silicon content in such a silicon-based domain is preferably 65 weight % or more, and more preferably 80 weight % or more with respect to the total weight of the silicon-based domain.

In general, a silicon-based active powder which does not contain pores will, during the cycles of charge-discharge of a battery, lead to a volume expansion, or swelling, of said anode and as a consequence to the swelling of said battery. This swelling of the active powder usually leads to the formation of fractures or cracks, propagating throughout the anode. These fractures or cracks lead to loss of contacts and/or additional SEI formation, which cause a drastic reduction of the cycle life of the battery.

The presence of pores in the particles of the active powder allows for absorption of the expansion of the silicon-based domains by the matrix, during the cycles of charge-discharge of a battery. This leads to a reduction of a corresponding swelling of the battery itself, thereby reducing mechanical stress and fractures in the active powder and thus in the anode, allowing a battery to be used during more charge-discharge cycles, thereby extending the life of the battery.

However, too much porosity is to be avoided, because it reduces the volumetric capacity of the battery.

In the present invention, the discrete cross-sections of pores according to Embodiment 1 may have both a d95 value for the number-based distribution of maximum Feret diameters xFmax inferior or equal to 150 nm and preferably inferior or equal to 90 nm, and a ratio of the d95 value over the d50 value (d95/d50) of the number-based distribution of maximum Feret diameters xFmax inferior or equal to 3.0. The reason may be that, proportionally to their size, large pores do not contribute much to reducing the swelling of the battery, while they cause a significant reduction in the volumetric capacity of the battery. It is believed by the inventors that this is caused by the fact that the absorption of the expansion of the silicon-based domains by the matrix is a localized phenomenon acting only over a limited range, and that large pores have much more theoretical absorbing capacity than what can really be used locally by the silicon-based domains present.

In the framework of the present invention, it has been observed that the battery comprising the negative electrode using the powder according to the present invention has a reduced swelling and an increased cycle life compared to batteries using a traditional active powder at comparable silicon content.

Indeed, it has been observed that: i.) a decrease of the swelling of the anode while ii.) keeping a high specific capacity, together with iii.) an increased cycle life of the battery wherein said powder is used as the negative electrode, could be achieved by a combination of the claimed d95 value and the d95/d50 ratio, for at least 1000 discrete cross-sections of pores of the silicon-based domains included in the cross-section of the powder.

Embodiment 2

In a second embodiment according to Embodiment 1, the cross-section of the powder comprises cross-sections of particles, the powder has a silicon content C expressed in weight percent (wt %), wherein $3 \times 10^{-4} \times C \leq F \leq 4 \times 10^{-3} \times C$, with F=Sp/Sc, Sp being a sum of each of the areas of the at least 1000 discrete cross-sections of pores and Sc being a sum of each of the areas of the cross-sections of particles comprising the at least 1000 discrete cross-sections of pores, Sc and Sp being measured on the same said at least one electron microscopy image of said cross-section of said powder. The correlation between the fraction of the total of the areas occupied by the cross-section of pores and the silicon content of the powder ensures that there is sufficient porosity to absorb a significant proportion of the silicon expansion, but not so much that there is excessive porosity, reducing the volumetric capacity disproportionally.

Preferably said fraction F is at least $4\times10^{-4}\times C$. Preferably said fraction F is at most $3\times10^{-3}\times C$.

As an illustration of the calculation of F, we take a powder with an average silicon content C of 15 wt %. During the visualization of microscopy images of the cross-section of the powder, 3 images are selected to reach a total number of at least 1000 cross-sections, in that case 1264 cross-sections.

For each of the 3 images, the fraction of the total of the areas occupied by the cross-sections of the pores (Sp) over the total of the areas occupied by the cross-section(s) of the particle(s) (Sc) is determined using a suitable image analysis software; the 3 fractions obtained are 0.022 (2.2%), 0.023 (2.3%) and 0.024 (2.4%).

F is the average value of those 3 fractions, thus F=0.023 (2.3%). The requirement $3\times10^{-4}$ C≤F≤$4\times10^{-3}$ C is met since $3\times10^{-4}\times15$ 0.023 $4\times10^{-3}\times15$.

Embodiment 3

In a third embodiment according Embodiment 1 or 2, the powder has a silicon content C expressed in weight percent (wt %), wherein 10 wt %≤C≤60 wt %.

Embodiment 4

In a fourth embodiment according to any of the Embodiments 1 to 3, each of the at least 1000 discrete cross-sections of pores has a maximum Feret diameter xFmax, a minimum Feret diameter xFmin and a ratio xFmax/xFmin, wherein the average value of the ratios xFmax/xFmin of the at least 1000 discrete cross-sections of pores is at most 2.0 and preferably at most 1.5. It is believed that very elongated pores, resulting in cross-sections with a large ratio xFmax/xFmin, may actually weaken the mechanical strength of the particles, due to the fact that such pores can be considered small cracks, and will act as stress concentrators and crack initiators. Pores resulting in cross-sections having an isotropic shape, i.e. having dimensions which are more or less similar in all directions are therefore preferred. The xFmax and xFmin values are measured, for each of the at least 1000 cross-sections of the pores, by image analysis of the at least one electron microscopy image of the cross-section of the powder, the ratio xFmax/xFmin is calculated for each of the at least 1000 cross-sections of the pores and the average value of the xFmax/xFmin ratios obtained is determined.

Embodiment 5

In a fifth embodiment according to any of the Embodiments 1 to 4, the powder comprises at least 90% by weight of said particles, with respect to the total weight of the powder, and preferably at least 95% by weight.

Embodiment 6

In a sixth embodiment according to any of the Embodiments 1 to 5, the silicon-based domains have a chemical composition having at least 65% by weight of silicon, and preferably having at least 80% by weight of silicon, wherein preferably the silicon-based domains are free of other elements than Si and O.

Embodiment 7

In a seventh embodiment according to any of the Embodiments 1 to 6, the powder has a silicon content C and an oxygen content D, both expressed in weight percent (wt %), wherein D≤0.15 C, and preferably D≤0.12 C.

Embodiment 8

In an eighth embodiment according to any of the Embodiments 1 to 7, the powder has a BET surface area which is at most 15 $m^2/g$ and preferably at most 12 $m^2/g$.

In this Embodiment 8, the BET surface area may preferably be at most 5 $m^2/g$.

Embodiment 9

In a ninth embodiment according to any of the Embodiments 1 to 8, the particles comprised in the powder have a volume-based particle size distribution with a d10 comprised between 0.1 μm and 10 μm, a d50 comprised between 2 and 20 μm, and a d90 comprised between 3 and 30 μm.

Embodiment 10

In a tenth embodiment according to any of the Embodiments 1 to 9, the matrix material comprised in the particles is a product of the thermal decomposition of at least one of the following compounds: polyvinyl alcohol (PVA), polyvinyl chloride (PVC), sucrose, coal-tar pitch, petroleum pitch, lignin, a resin.

These compounds may also be referred to as matrix precursors.

In this Embodiment 10, the matrix precursor may preferably be petroleum pitch.

Embodiment 11

In an eleventh embodiment according to any of the Embodiments 1 to 10, the powder also contains graphite, wherein the graphite is not embedded in the matrix material.

Embodiment 12

In a twelfth embodiment according to any of the Embodiments 1 to 11, the invention further concerns a battery comprising any of the variants of powder as defined above, wherein preferably the battery has a negative electrode, wherein the powder is present in the negative electrode.

Embodiment 13

In a thirteenth embodiment according to any of the Embodiments 1 to 12, the invention further concerns an electronic device comprising the battery comprising the negative electrode, wherein the powder is present in the negative electrode.

In a second aspect, the present invention concerns a method for preparing a powder according to Embodiments 1 to 11.

Embodiment 14

In a fourteenth embodiment, the invention concerns a method for preparing a powder for use in a negative electrode of a battery, comprising the successive steps of:

a. Providing a silicon nano powder, providing a matrix precursor powder capable of softening at a softening temperature below 500° C. and capable of fully decomposing into carbon at a decomposition temperature above 500° C. and providing a pore former powder capable of generating one or more gaseous compounds above the softening temperature of the matrix precursor powder.
b. Mixing the silicon nano powder, the matrix precursor powder and the pore former powder in a weight ratio pore former powder to silicon nano powder comprised between 0.05 and 0.6 and in a weight ratio matrix precursor powder to silicon nano powder such that in the final powder the weight ratio carbon to silicon is comprised between 0.5 and 5.
c. Blending the resulting mixture until a homogeneous mixture is obtained.
d. Heating up the homogeneous mixture, under an oxygen-free atmosphere, at a temperature above the softening temperature of the matrix precursor powder but below the temperature of generation of one or more gaseous compounds by the pore former and stirring until a homogeneous dispersion is obtained.
e. Cooling down the homogeneous dispersion, under an oxygen-free atmosphere, to a solid state and grinding the solid obtained into an intermediate product.
f. Performing a heat-treatment, under an inert atmosphere, of the intermediate product at a temperature above the temperature of full decomposition of the matrix precursor.
g. Cooling down the heat-treated intermediate product, under an inert atmosphere, and grinding it into a final powder.

It is important for the pore former to generate one or more gaseous compounds at a temperature above the softening temperature of the matrix precursor powder to avoid that, when softening, the matrix precursor fills up the pores which just formed.

By a silicon nano powder, it is meant a powder having a metal purity of at least 98% and having a particle size distribution with a d50 inferior or equal to 200 nm.

By a temperature of full decomposition of the matrix precursor, it is meant the temperature, above 500° C., at which the weight loss stops in a TGA analysis of said matrix precursor powder done under a nitrogen atmosphere.

By a homogeneous mixture it is meant a mixture in which the individual constituents, being the silicon nano powder, the matrix precursor powder and the pore former powder, cannot be visually differentiated with the naked eye.

By a homogeneous dispersion it is meant a dispersion in which only one phase can be visually identified with the naked eye.

Preferably, the intermediate product after the grinding step, is fine enough to pass in its entirety through a 400-mesh sieve.

Preferably, the final powder after the grinding step is fine enough to pass in its entirety through a 325-mesh sieve.

In this Embodiment 14, the pore former may be at least one of the following compounds: a metal powder, a metal oxide powder, an organic polymer powder and may preferably be a zinc powder or a zinc oxide powder.

In a third aspect, the present invention concerns an alternative method for preparing a powder according to Embodiment 1 to 11.

Embodiment 15

In a fifteen embodiment, the invention concerns an alternative method for preparing a powder for use in a negative electrode of a battery, comprising the successive steps of:

a. Providing a silicon nano powder, providing a matrix precursor powder capable of softening at a softening temperature below 500° C. and capable of fully decomposing into carbon at a decomposition temperature above 500° C. and providing a pore former powder capable of generating one or more gaseous compounds above the softening temperature of the matrix precursor.
b. Preparing an intermediate product in which the silicon nano powder and the pore former powder are dispersed in the matrix precursor.
c. Performing a heat-treatment of the intermediate product at a temperature above the temperature of full decomposition of the matrix precursor.

Embodiment 16

In a sixteenth embodiment according to Embodiment 14 or 15, the invention further concerns a powder obtainable from the method of Embodiment 14 or from the method of Embodiment 15.

Embodiment 17

In a seventeenth embodiment according to Embodiment 14 or 15, the invention finally concerns a powder according to any of the Embodiments 1 to 11, obtainable from the method of Embodiment 14 or from the method of Embodiment 15.

DETAILED DESCRIPTION

Figure 1:
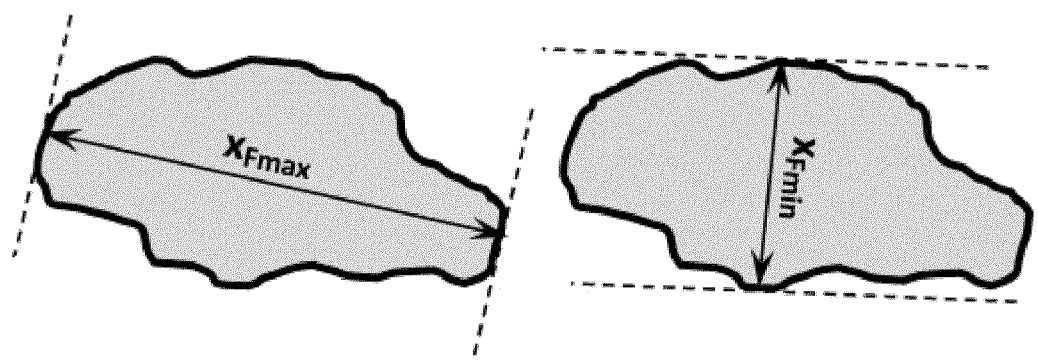
FIG. 1: Schematic illustration of the concepts of maximum Feret diameter (xFmax) and minimum Feret diameter (xFmin)

In the drawings and the following detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description and accompanying drawings.

Analytical Methods Used

Determination of the Silicon Content

The silicon contents of the powders in the examples and the counterexamples are measured by X-Ray Fluorescence (XRF) using an energy 20 dispersive spectrometer. This method has an experimental random error of +/−0.3 wt % Si.

Determination of the Oxygen Content

The oxygen contents of the powders in the examples and the counterexamples are determined by the following method, using a Leco TC600 oxygen-nitrogen analyzer. A sample of the powder is put in a closed tin capsule that is put itself in a nickel basket. The basket is put in a graphite crucible and heated under helium as carrier gas to above 2000° C. The sample thereby melts and oxygen reacts with the graphite from the crucible to CO or $CO_2$ gas. These gases are guided into an infrared measuring cell. The observed signal is recalculated to an oxygen content.

Determination of the Specific Surface Area (BET)

The specific surface area is measured with the Brunauer-Emmett-Teller (BET) method using a Micromeritics Tristar 3000. 2 g of the powder to be analyzed is first dried in an oven at 120° C. for 2 hours, followed by $N_2$ purging. Then the powder is degassed in vacuum at 120° C. for 1 hour prior to the measurement, in order to remove adsorbed species.

Determination of the Electrochemical Performance

The electrochemical performance of the powders in the examples and the counterexamples are determined by the following method. After having determined the specific capacity of the powder to be tested in a coin-cell vs. lithium, using the procedure described in EP3525267, the powder is dry mixed with graphite particles so as to reach a specific capacity for the mixture powder+graphite of 650 mAh/g. The mixture powder+graphite is sieved using a 45 μm sieve and mixed with carbon black, carbon fibers and sodium carboxymethyl cellulose binder in water (2.5 wt %). The ratio used is 89 weight parts mixture powder+graphite/1 weight part carbon black (C65)/2 weight parts carbon fibers (VGCF) and 8 weight parts carboxymethyl cellulose (CMC).

These components are mixed in a Pulverisette 7 planetary ball mill for 30 minutes at 250 rpm.

A copper foil cleaned with ethanol is used as current collector for the negative electrode. A 200 μm thick layer of the mixed components is coated on the copper foil. The coating is dried for 45 minutes in vacuum at 70° C. A 13.86 $cm^2$ rectangular shaped electrode is punched from the dried coated copper foil, dried overnight at 110° C. under vacuum and used as negative electrode in a pouch-cell.

The positive electrode is prepared as follows: a commercial $LiNi_{3/5}Mn_{1/5}Co_{1/5}O_2$ (NMC 622) powder is mixed with carbon black (C65), carbon fibers (VGCF) and a solution of 8 wt % polyvinylidene difluoride (PVDF) binder in N-Methyl-2-pyrrolidone (NMP). The ratio used is 92 weight parts of a commercial NMC 622 powder/1 weight part carbon black/3 weight parts carbon fibers and 4 weight parts PVDF. The components are mixed in a Pulverisette 7 planetary ball mill for 30 minutes at 250 rpm. An aluminum foil cleaned with ethanol is used as current collector for the positive electrode. A layer of the mixed components is coated on the aluminum foil, with a thickness ensuring a ratio negative electrode capacity over positive electrode capacity of 1.1. The coating is dried for 45 minutes in vacuum at 70° C. A 11.02 $cm^2$ rectangular shaped electrode is punched from the dried coated aluminum foil, dried overnight at 110° C. under vacuum and used as positive electrode in a pouch-cell.

The electrolyte used is 1M $LiPF_6$ dissolved in EC/DEC solvents (1/1 in volume)+2 wt % VC+10 wt % FEC additives. All samples are tested in a high precision battery tester (Maccor 4000 series).

The assembled pouch-cells are then tested using the procedure described below, where the first cycle corresponds to the conditioning of the battery and where "CC" stands for "constant current" and "CV" stands for "constant voltage".

Cycle 1:
  Rest 4 h (Initial rest)
  Charge at C/40 until 15% of theoretical cell capacity
  Rest 12 h
  CC charge at C/20 to 4.2V
  CC discharge at C/20 to 2.7V
From cycle 2 on:
  CC charge at C/2 to 4.2V, then CV charge until C/50
  CC discharge at C/2 to 2.7V It is well established that a cycle life of at least 300 cycles in such a full-cell is required for an active powder with a specific capacity of about 650 mAh/g, in view of a commercial application.

Determination of the Swelling of the Battery

In the following, "battery", "cell" and "pouch-cell" are all synonyms.

By swelling of the battery, or the anode, it is here meant the variations of the thickness of the battery, or the anode, during the cycles of charge and discharge. Since the swelling of the cathode is very limited and since the same cathode is used in all batteries disclosed in this current application, the swelling of the battery is directly correlated to the swelling of the anode. As a consequence, the maximum state of the swelling (thickness of the battery at its maximum) is reached at the end of the charge of the battery, which corresponds to the maximum lithiation of the anode, whereas the minimum state of the swelling (thickness of the battery at its minimum, except for its initial state after assembling) is reached at the end of the discharge of the battery, which corresponds to the maximum delithiation of the anode.

The swelling of the batteries comprising the powders in the examples and the counterexamples as active powder, are determined by the following method. Pouch-cells containing the different powders to be evaluated, are assembled following the method previously described. All anodes comprise powders, or mixtures of powders and graphite, with similar specific capacities, namely around 650 mAh/g. All anodes have similar loadings and densities, namely around 5.5 $mg/cm^2$ and 1.4 $g/cm^3$ respectively. Only the nature of the powder in the anode varies in these pouch-cells.

Figure 2:
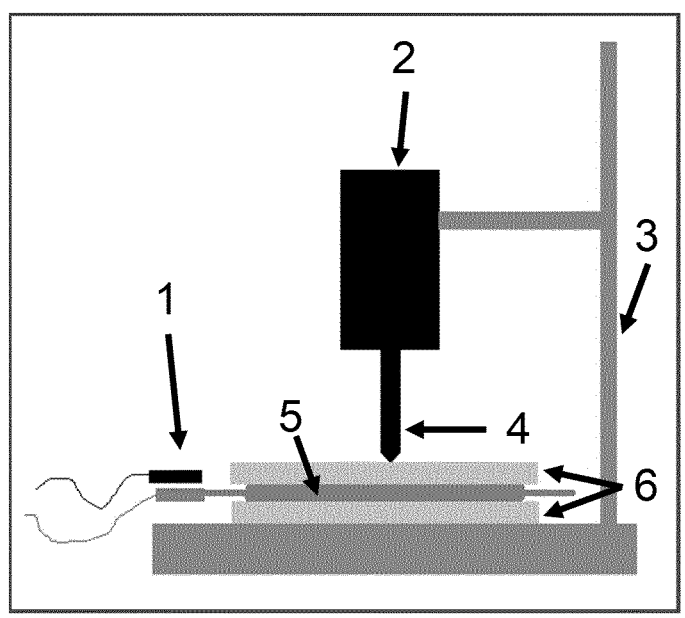
FIG. 2: Schematic illustration of the set-up used to measure the swelling of the battery. 1. Connection from the pouch-cell to the battery tester 2. Measuring device 3. Stand 4. Displacement sensor 5. Pouch-cell 6. Metal plates

The thickness of each pouch-cell (5) is first measured, before it is introduced in the set-up as described in FIG. 2. The metal plates (6) ensure that a homogeneous and constant external pressure is applied on the pouch-cell during the whole measurement; for all the measurements the pressure applied is 7 psi. The displacement sensor (4) is placed in contact with the upper metal plate and the displacement value on the measuring device (2) is set on 0 μm. The measuring device (2) has a precision of 0.1 μm. The pouch-cell is connected to the battery tester using crocodile clamps (1). The pouch-cell is then cycled using the procedure described below, where "CC" stands for "constant current" and "CV" stands for "constant voltage".

24 h of rest phase to get a stable thickness value
Cycle 1:
  CC charge at C/40 until 15% of theoretical cell capacity
  Rest phase of 12 h
  CC charge at C/20 until 4.2V, then CV charge until C/100
  CC discharge at C/20 until 2.7V
Cycles 2 to 4:
  CC charge at C/5 until 4.2V, then CV charge until C/50
  CC discharge at C/5 until 2.7V Cycle 5:
CC charge at C/10 until 4.2V, then CV charge until C/100

The recorded data are then extracted and processed to plot the evolution of the swelling of the pouch-cell in function of time. The displacement, or swelling, measured at the end of the charge of the $5^{th}$ cycle is used to compare the performance of the powders comprised in the anodes. As an illustration, if the thickness of the battery before cycling is equal to 50 μm and the thickness at the end of the charge of the $5^{th}$ cycle is equal to 70 μm, the swelling of the battery is equal to 40%.

Determination of the Size of the Discrete Cross-Sections of Pores

It is very difficult to measure directly and accurately the size of pores comprised in solid particles. Some methods, such as mercury porosimetry and gas adsorption allow to define a distribution of the volume and the size of the pores, based on mathematical models. However, in such methods, many parameters will affect the accuracy of the results obtained, such as the size of the pores, the shape of the pores (spherical or not, regular or not), the type of porosity (open or closed porosity), etc. (see for example S. Amziane and F. Collet (eds.), *Bio-aggregates Based Building Materials*, RILEM State-of-the-Art Reports 23, DOI 10.1007/978-94-024-1031-0_2).

In the present application, it was thus decided to perform a cross-section of the powder and to analyse the cross-section by microscopy analysis. This method allows a direct, easily reproducible by a skilled person, visualization of the pores and an easy measurement of the properties (size, area, shape) of the cross-sections of the pores by an image analysis performed using a suitable image analysis software.

In order to measure the maximum Feret diameter xFmax, the minimum Feret diameter xFmin and the area of each of the at least 1000 cross-sections of the pores following a SEM-based procedure, 500 mg of the powder to be evaluated is embedded in 7 g of a resin (Buehler EpoxiCure 2) consisting of a mix of 4 parts Epoxy Resin (20-3430-128) and 1 part Epoxy Hardener (20-3432-032). The resulting sample of 1" diameter is dried during at least 8 hours. It is then polished, first mechanically using a Struers Tegramin-30 until a thickness of maximum 5 mm is reached, and then further polished by ion-beam polishing (Cross Section Polisher Jeol SM-09010) for about 6 hours at 6 kV, to obtain a polished surface. A carbon coating is finally applied on this polished surface by carbon sputtering using a Cressington 208 carbon coater for 12 seconds, to obtain the sample that will be analyzed by SEM.

In order to measure xFmax, xFmin and the area of each of the at least 1000 cross-sections of the pores following a TEM-based procedure, 10 mg of the powder to be evaluated is placed in a focused ion beam scanning electrode microscope (FIB-SEM) equipment. A platinum layer is deposited on top of the surface of the powder. A lamella of the powder is extracted using the FIB. This lamella is further placed on a TEM sample holder and analyzed following the procedure described below.

For the purpose of illustrating, in a non-limitative way, the determination of the xFmax, xFmin and area of each of the at least 1000 cross-sections of the pores, a SEM-based procedure is detailed for the powder Example 1 (E1) provided below. Although Example 1 refers to a SEM-based procedure, other embodiments in the scope of the invention can be characterized by a similar TEM-based procedure.

Figure 3A:
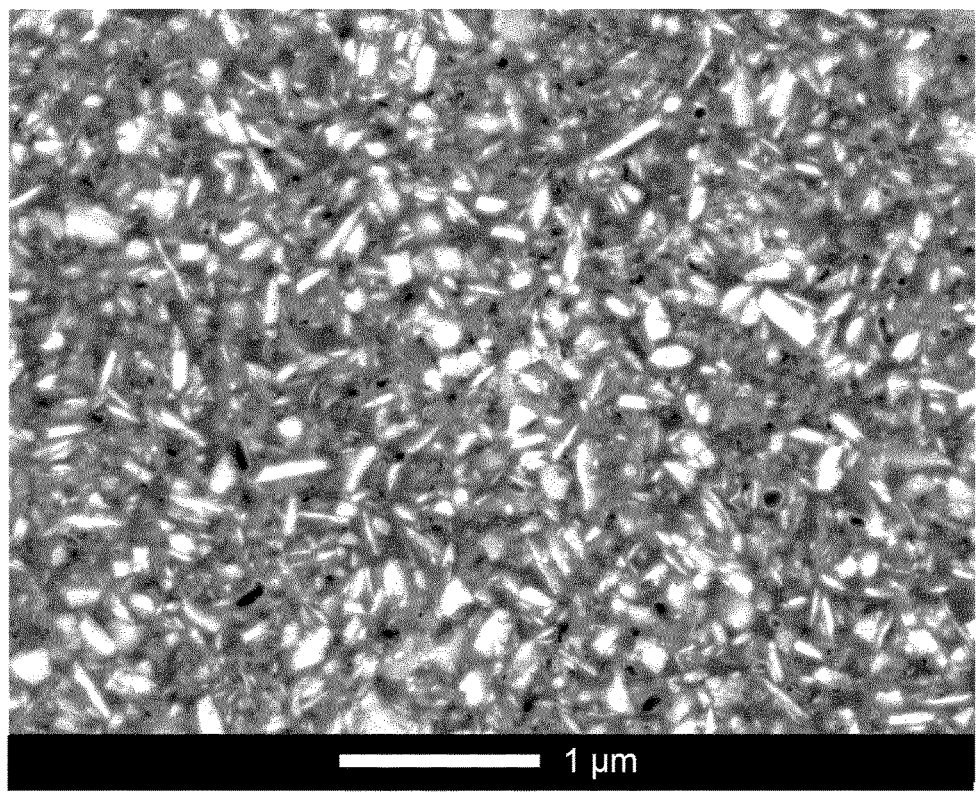
FIG. 3a: Cross-section of a particle of powder E1 as acquired during an SEM analysis. The brightest areas are the cross-sections of the silicon-based domains, the grey areas are the cross-sections of the carbonaceous matrix and the black areas are the cross-sections of the pores.
Figure 3B:
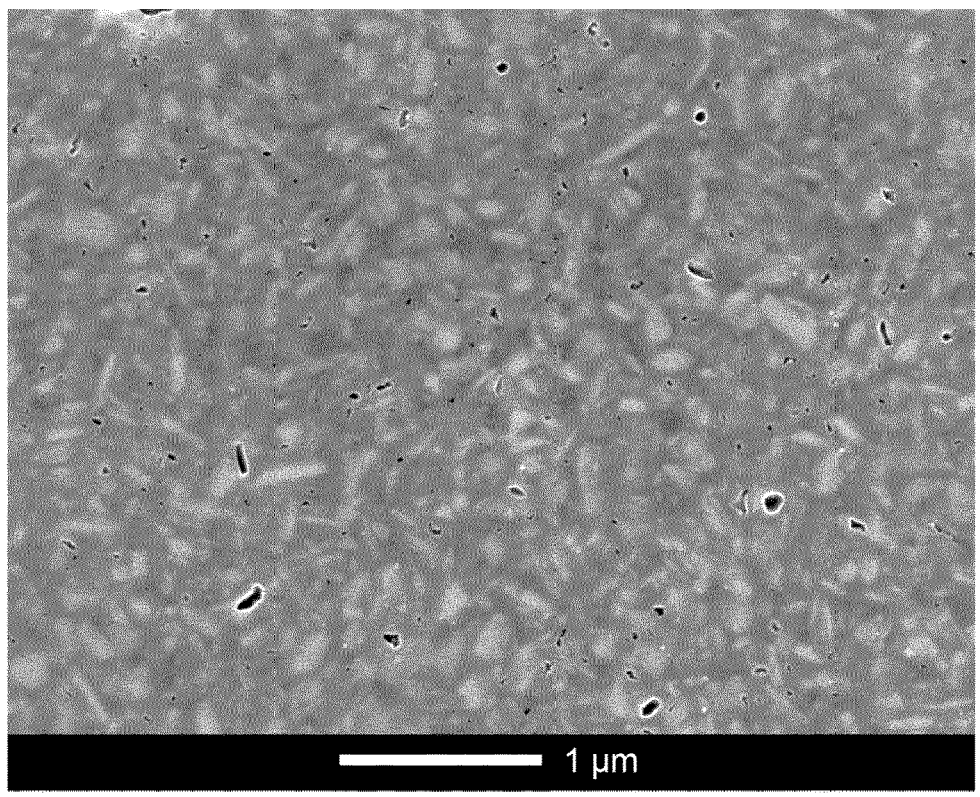
FIG. 3b: Same cross-section as in FIG. 3a after brightness/contrast adjustment, done using a suitable image analysis software for an easier visualization of the cross-sections of the pores (darkest areas).

1. Multiple SEM images of the cross-section of the powder embedded in a resin are acquired (one of the images is provided in FIG. 3a).
2. The contrast and brightness settings of the images are adjusted for an easy visualization of the cross-sections of the pores (see FIG. 3b).
3. At least 1000 discrete cross-sections of pores, not overlapping with another cross-section of a pore, are selected from one or several of the acquired SEM image(s), using a suitable image analysis software. These discrete cross-sections of pores can be selected from one or more cross-sections of particles of a given powder.
4. xFmax and xFmin values, as well as areas of each of the at least 1000 discrete cross-sections of pores are measured using a suitable image analysis software.
5. d50 and d95 values of the number-based distribution of maximum Feret diameters xFmax of the cross-section of the pores and the resulting d95/d50 ratios are calculated.
6. xFmax/xFmin ratios are calculated for each of the at least 1000 discrete cross-sections of pores, as well as the average value of the xFmax/xFmin ratios obtained.
7. For each of the selected images, the fraction of the total of the areas occupied by the at least 1000 cross-sections of the pores over the total of the areas occupied by the cross-sections of the particle(s) comprising the at least 1000 cross-sections of the pores is determined using a suitable image analysis software, and the average value F of these fractions is calculated.

Determination of the Particle Size of the Powders

The volume-based particle size distribution of the powders is determined with a Malvern Mastersizer 2000. The following measurement conditions are selected: compressed range; active beam length 2.4 mm; measurement range: 300 RF; 0.01 to 900 μm. The sample preparation and measurement are carried out in accordance with the manufacturer's instructions.

Experimental Preparation of Counterexamples and Examples

Counterexample 1 (CE1), not According to the Invention

A silicon nano powder is obtained by applying a 50 kW radio frequency (RF) inductively coupled plasma (ICP), using argon as plasma gas, to which a micron-sized silicon powder precursor is injected at a rate of circa 200 g/h, resulting in a prevalent (i.e. in the reaction zone) temperature above 2000K. In this first process step, the precursor becomes totally vaporized. In a second process step, an argon flow of 90 $Nm^3$/h is used as quench gas immediately downstream of the reaction zone in order to lower the temperature of the gas below 1600K, causing a nucleation into metallic submicron silicon powder. Finally, a passivation step is performed at a temperature of 100° C. during 5 minutes by adding 100 l/h of a $N_2/O_2$ mixture containing 1 mole % oxygen.

The volume-based particle size distribution of the silicon nano powder is determined to be: d10=63 nm, d50=113 nm and d90=205 nm and the oxygen content was 6.9 wt %.

In order to produce powder CE1, a blend is made of the mentioned silicon nano powder and a matrix precursor powder selected from the list of polyvinyl alcohol (PVA), polyvinyl chloride (PVC), sucrose, coal-tar pitch and petroleum pitch. The weight ratio matrix precursor powder to silicon nano powder is chosen such as after the thermal decomposition at 1000° C. of the matrix precursor, the weight ratio carbon to silicon is equal to 1. In the case of powder CE1, and of all the powders in the following examples and counterexamples, the matrix precursor used is petroleum pitch.

This blend is heated to a temperature 20° C. above the softening point of the matrix precursor powder, which corresponds to a temperature of 350° C. in the case of powder CE1, under $N_2$ and, after a waiting period of 60 minutes, mixed for 30 minutes under high shear by means of a Cowles dissolver-type mixer operating at 1000 rpm.

The mixture of silicon nano powder in the matrix precursor thus obtained is cooled under $N_2$ to room temperature and, once solidified, pulverized and sieved on a 400-mesh sieve. A thermal after-treatment is given to the obtained mixture of silicon and matrix precursor as follows: the product is placed in a quartz crucible in a tube furnace, heated up at a heating rate of 3° C./min to 1000° C., kept at that temperature for two hours and then cooled. All this is performed under argon atmosphere.

The fired product is finally ball-milled for 1 hour at 200 rpm with alumina balls and sieved over a 325-mesh sieve to form a final powder, further called powder CE1.

The total silicon content in powder CE1 is measured to be 50.2 wt % by XRF, having an experimental error of +/−0.3 wt %. The oxygen content of the powder CE1 is measured to be 5.9 wt %. The specific surface of the powder CE1 is measured to be 3.5 m²/g. The volume-based particle size distribution of the particles of powder CE1 has a d10 of 3.2 μm, a d50 of 8.1 μm and a d90 of 18.4 μm. All those properties of powder CE1 are also given in Table 1.

A cross-section of the powder CE1 is performed and analysed by SEM. No porosity can be detected in the resulting microscopy images, leading to an impossibility to measure the xFmax and xFmin values of each of the cross-section of the pores and to calculate the resulting average value of the xFmax/xFmin ratio, the d50 and d95 values of the number-based distribution of maximum Feret diameters xFmax of the cross-sections of the pores and the resulting d95/d50 ratio. Those values are thus marked N/A in Table 2. The average value F of the fractions of the total of the areas occupied by the cross-sections of the pores over the total of the areas occupied by the cross-sections of the particle(s) is equal to 0.

Powder CE1 is further evaluated in a battery, both to measure the cycle life achieved by the battery and the swelling of the battery, applying the procedures previously described. The battery achieves 257 cycles at 80% of its initial capacity and the swelling of the battery at the end of the charge of cycle 5 is measured to be 30.5% Those values are also reported in Table 2.

TABLE 1

Table 1: Physico-chemical properties of powders CE1, CE2, E1 and E2

|  | Powder CE1 | Powder CE2 | Powder E1 | Powder E2 |
|---|---|---|---|---|
| Silicon content C (%) | 50.2 | 50.1 | 50.1 | 50.2 |
| Oxygen content D (%) | 5.9 | 6.0 | 5.9 | 5.8 |
| BET (m²/g) | 3.5 | 18.6 | 4.6 | 10.9 |
| PSD d10 (μm) | 3.2 | 3.6 | 3.1 | 3.4 |
| PSD d50 (μm) | 8.1 | 8.7 | 8.3 | 8.4 |
| PSD d90 (μm) | 18.4 | 19.3 | 18.6 | 18.8 |

Table 2: Properties of the cross-sections of the pores comprised in powders CE1, CE2, E1 and E2 and performance of batteries comprising powders CE1, CE2, E1 and E2 as active powders

TABLE 2

|  | Powder CE1 | Powder CE2 | Powder E1 | Powder E2 |
|---|---|---|---|---|
| xFmax d50 (nm) | N/A | 56 | 33 | 26 |
| xFmax d95 (nm) | N/A | 182 | 82 | 40 |
| Ratio xFmax d95/d50 | N/A | 3.25 | 2.48 | 1.54 |
| Average ratio xFmax/xFmin | N/A | 2.12 | 1.40 | 1.37 |
| Average fraction F | 0 | 0.228 | 0.023 | 0.115 |
| Specific capacity (mAh/g) | 1609 | 1613 | 1611 | 1607 |
| Battery cycle life at 80% initial capacity (cycles) | 257 | 176 | 324 | 395 |
| Battery swelling at end of charge 5$^{th}$ cycle (%) | 30.5 | 31.1 | 26.4 | 21.2 |

Counterexample 2 (CE2), not According to the Invention

The same silicon nano powder as for powder CE1 is used in the synthesis of powder CE2. In order to produce powder CE2, a blend is made of the mentioned silicon nano powder, a zinc nano powder and a petroleum pitch powder as matrix precursor. The zinc nano powder has a volume-based particle size distribution with a d50 of 42 nm and a d95 of 92 nm. The weight ratio matrix precursor powder to silicon nano powder is chosen such as after the thermal decomposition at 1000° C. of the matrix precursor, the weight ratio carbon to silicon is equal to 1. The weight ratio zinc nano powder to silicon nano powder used is equal to 1.

This blend is heated to 350° C., under $N_2$ and, after a waiting period of 60 minutes, mixed for 30 minutes under high shear by means of a Cowles dissolver-type mixer operating at 1000 rpm.

The mixture of silicon nano powder and zinc nano powder in the matrix precursor thus obtained is cooled under $N_2$ to room temperature and, once solidified, pulverized and sieved on a 400-mesh sieve. A thermal after-treatment is given to the obtained mixture as follows: the product is placed in a quartz crucible in a tube furnace, heated up at a heating rate of 3° C./min to 1000° C., kept at that temperature for two hours and then cooled. All this is performed under argon atmosphere. The zinc nano particles present in the mixture evaporate below 1000° C. (the boiling point of zinc is 907° C.) and, as a consequence, leave pores inside the carbon matrix created during the heat-treatment.

The fired product is finally ball-milled for 1 hour at 200 rpm with alumina balls and sieved over a 325-mesh sieve to form a final powder, further called powder CE2.

The total silicon content in powder CE2 is measured to be 50.1 wt % by XRF, having an experimental error of +/−0.3 wt %. The oxygen content of the powder CE2 is measured to be 6.0 wt %. The specific surface of the powder CE2 is measured to be 18.6 m²/g. The volume-based particle size distribution of the particles of powder CE2 has a d10 of 3.6 μm, a d50 of 8.7 μm and a d90 of 19.3 μm. All those properties of powder CE2 are also given in Table 1.

A cross-section of the powder CE2 is performed and analysed by SEM. Based on an image analysis of the selected microscopy images, the xFmax and xFmin values of each of the cross-section of the pores are measured and the resulting average value of the xFmax/xFmin ratio is calculated, this latter being equal to 2.12. The d50 and d95 values of the number-based distribution of maximum Feret diameters xFmax of the cross-sections of the pores and the resulting d95/d50 ratio are also calculated based on the same images, the d50 value being equal to 56 nm and the d95 value to 182 nm. The large size of the cross-sections of the pores in powder CE2 (xFmax d95=182 nm), larger than the d95 of the nano particles of zinc (92 nm) may be explained by the formation of agglomerates of zinc nano particles, due to the high amount of zinc present in the mixture, prior to the heat-treatment. The average value F of the fractions of the total of the areas occupied by the cross-sections of the pores over the total of the areas occupied by the cross-sections of the particle(s) is also calculated, based on the analysis of the same images and is equal to 0.228. All these values are reported in Table 2.

Powder CE2 is further evaluated in a battery, both to measure the cycle life achieved by the battery and the swelling of the battery, applying the procedures previously described. The battery achieves 176 cycles at 80% of its initial capacity and the swelling of the battery at the end of the charge of cycle 5 is measured to be 31.1% Those values are also reported in Table 2. As mentioned previously, a battery comprising a powder comprising particles with too many and too large pores may suffer from the formation of fractures or cracks in the particles, which may ultimately lead to the collapsing of the carbon structure, causing an increased SEI formation, a drastic reduction of the cycle life and no benefits in terms of swelling of the battery. This might be an explanation of the low performance achieved by the battery containing powder CE2.

Example 1 (E1), According to the Invention

Powder E1 is prepared following the same method as powder CE2, except that in the blend of silicon nano powder, zinc nano powder and matrix precursor powder, the weight ratio zinc nano powder to silicon nano powder is equal to 0.1, instead of 1. All the rest is kept the same.

The values of silicon content, oxygen content, BET and volume-based particle size distribution of powder E1 are given in Table 1.

A cross-section of the powder E1 is performed and analysed by SEM. The average value of the xFmax/xFmin ratio of the cross-sections of the pores, the d50 and d95 values of the number-based distribution of maximum Feret diameters xFmax of the cross-sections of the pores and the resulting d95/d50 ratio, as wells as the average value F of the fractions of the total of the areas occupied by the cross-sections of the pores over the total of the areas occupied by the cross-section(s) of the particle(s) are reported in Table 2.

Powder E1 is further evaluated in a battery, both to measure the cycle life achieved by the battery and the swelling of the battery, applying the procedures previously described. The results are reported in Table 2.

Example 2 (E2), According to the Invention

Powder E2 is prepared following the same method as powder CE2, except that in the blend of silicon nano powder, zinc nano powder and matrix precursor, the weight ratio zinc nano powder to silicon nano powder is equal to 0.5 instead of 1 and a zinc nano powder with a slightly different PSD is used, with a d50 of 35 nm and a d95 of 51 nm. All the rest is kept the same.

The values of silicon content, oxygen content, BET and volume-based particle size distribution of powder E2 are given in Table 1.

A cross-section of the powder E2 is performed and analysed by SEM. The average value of the xFmax/xFmin ratio of the cross-sections of the pores, the d50 and d95 values of the number-based distribution of maximum Feret diameters xFmax of the cross-sections of the pores and the resulting d95/d50 ratio, as wells as the average value F of the fractions of the total of the areas occupied by the cross-sections of the pores over the total of the areas occupied by the cross-section(s) of the particle(s) are reported in Table 2.

Powder E2 is further evaluated in a battery, both to measure the cycle life achieved by the battery and the swelling of the battery, applying the procedures previously described. The results are reported in Table 2.

Counter Examples 3 and 4, not According to the Invention and Examples 3 and 4, According to the Invention The same methodology is applied to obtain 4 powders with Si contents of 20.0 wt % (±0.3 wt %).

Powders CE3, CE4, E3 and E4 are produced following the same method as for powders CE1, CE2, E1 and E2 respectively, except that the weight ratio matrix precursor powder to silicon nano powder is chosen such as after the thermal decomposition at 1000° C. of the matrix precursor, the weight ratio carbon to silicon is equal to 4, instead of 1. All the rest is kept exactly the same.

The values of silicon content, oxygen content, BET and volume-based particle size distribution of powders CE3, CE4, E3 and E4 are given in Table 3.

Cross-sections of the powders CE3, CE4, E3 and E4 are performed and analysed by SEM. The average value of the xFmax/xFmin ratio of the cross-sections of the pores, the d50 and d95 values of the number-based distribution of maximum Feret diameters xFmax of the cross-sections of the pores and the resulting d95/d50 ratio, as wells as the average value F of the fractions of the total of the areas occupied by the cross-sections of the pores over the total of the areas occupied by the cross-section(s) of the particle(s) for powders CE3, CE4, E3 and E4 are reported in Table 4.

Powders CE3, CE4, E3 and E4 are further evaluated in a battery, both to measure the cycle life achieved by the battery and the swelling of the battery, applying the procedures previously described. The results are reported in Table 4.

It can be seen that for both silicon contents (circa 50 wt % and circa 20 wt %), the cells containing a powder according to the invention perform significantly better than the cells containing a powder not according to the invention, both in terms of swelling and cycle life.

TABLE 3

Table 3: Physico-chemical properties of powders CE3, CE4, E3 and E4

|  | Powder CE3 | Powder CE4 | Powder E3 | Powder E4 |
|---|---|---|---|---|
| Silicon content C (%) | 20.2 | 20.1 | 20.2 | 20.3 |
| Oxygen content D (%) | 2.3 | 2.2 | 2.3 | 2.4 |
| BET (m²/g) | 3.2 | 16.2 | 4.1 | 10.2 |
| PSD d10 (μm) | 3.4 | 3.5 | 3.3 | 3.4 |

TABLE 3-continued

Table 3: Physico-chemical properties of powders CE3, CE4, E3 and E4

|  | Powder CE3 | Powder CE4 | Powder E3 | Powder E4 |
|---|---|---|---|---|
| PSD d50 (μm) | 8.2 | 8.6 | 8.4 | 8.5 |
| PSD d90 (μm) | 18.6 | 19.3 | 18.7 | 18.9 |

Table 4: Properties of the cross-sections of the pores comprised in powders CE3, CE4, E3 and E4 and performance of batteries comprising powders CE3, CE4, E3 and E4 as active powders

TABLE 4

|  | Powder CE3 | Powder CE4 | Powder E3 | Powder E4 |
|---|---|---|---|---|
| xFmax d50 (nm) | N/A | 56 | 34 | 26 |
| xFmax d95 (nm) | N/A | 184 | 81 | 42 |
| Ratio xFmax d95/d50 | N/A | 3.29 | 2.38 | 1.62 |
| Average ratio xFmax/xFmin | N/A | 2.11 | 1.39 | 1.37 |
| Average fraction F | 0 | 0.118 | 0.012 | 0.059 |
| Specific capacity (mAh/g) | 808 | 807 | 805 | 809 |
| Battery cycle life at 80% initial capacity (cycles) | 248 | 172 | 322 | 391 |
| Battery swelling at end of charge 5$^{th}$ cycle (%) | 30.7 | 31.2 | 26.5 | 21.3 |

The invention claimed is:

1. A powder for use in a negative electrode of a battery, the powder comprising particles wherein the particles comprise a carbonaceous matrix material, silicon-based domains dispersed in the carbonaceous matrix material and pores, wherein when a cross-section of the powder is performed, the powder is crossed by a plane, which plane also crosses the particles making up the powder, which includes the plane crossing the carbonaceous matrix material, the silicon-based domains dispersed in the carbonaceous matrix material, and the pores of the particles, resulting in cross-sections of the particles, cross-sections of the silicon-based domains and cross-sections of the pores in the particles, wherein:

each cross-section of the pores in the particles has a maximum Feret diameter (xFmax), a minimum Feret diameter (xFmin), and an area, the cross-sections of the pores in the particles have a number-based pore size distribution of maximum Feret diameters with a d50 value and a d95 value, wherein d95≤150 nm, the ratio d95/d50≤3.0 and d50≥26 nm; and each particle cross-section has an area, wherein the xFmax, the xFmin, and the areas of the cross-sections of the pores in the particles are measured by image analysis of the cross-section of the powder, wherein at least 1000 discrete cross-sections of the pores in the particles are present and analyzed in the cross-section of the powder, wherein said powder has a silicon content C expressed in weight percent (wt %), wherein $3\times10^{-4} \times C \leq F \leq 4\times10^{-3} \times C$, with F=Sp/Sc, Sp being a sum of the areas of the at least 1000 discrete cross-sections of the pores in the particles and Sc being a sum of the areas of the cross-sections of the particles, Sc and Sp being measured on the same image of the powder cross-section.

2. The powder according to claim 1, wherein the silicon content C is 10 wt %≤C≤60 wt %.

3. The powder according to claim 1, wherein the cross-sections of the pores in the particles have a ratio xFmax/xFmin, wherein an average value of the ratios xFmax/xFmin of the cross-sections of the pores in the particles is at most 2.0.

4. The powder according to claim 3, wherein the average value of the ratios xFmax/xFmin of the cross-sections of the pores in the particles is at most 1.5.

5. The powder according to claim 1, wherein d95≤90 nm.

6. The powder according to claim 1, comprising at least 90% by weight of said particles.

7. The powder according to claim 1, wherein the silicon-based domains have a chemical composition having at least 65% by weight of silicon.

8. The powder according to claim 1, having an oxygen content D, expressed in weight percent (wt %), wherein D≤0.15 C.

9. The powder according to claim 1, having a BET surface area which is at most 15 m²/g.

10. The powder according to claim 1, wherein said particles have a volume-based particle size distribution with a d10 between 0.1 μm and 10 μm, a d50 between 2 and 20 μm, and a d90 between 3 and 30 μm.

11. The powder according to claim 1, wherein the carbonaceous matrix material is a product of the thermal decomposition of at least one compound selected from the group consisting of: polyvinyl alcohol (PVA), polyvinyl chloride (PVC), sucrose, coal-tar pitch, petroleum pitch, lignin, and a resin.

12. A battery having a negative electrode, wherein the negative electrode comprises the powder according to claim 1.

* * * * *